US011611095B2

United States Patent
Ogawa

(10) Patent No.: US 11,611,095 B2
(45) Date of Patent: Mar. 21, 2023

(54) FUEL CELL SYSTEM

(71) Applicant: TOYOTA JIDOSHA KABUSHIKI KAISHA, Toyota (JP)

(72) Inventor: Tomoya Ogawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 17/198,408

(22) Filed: Mar. 11, 2021

(65) Prior Publication Data

US 2021/0367246 A1 Nov. 25, 2021

(30) Foreign Application Priority Data

May 25, 2020 (JP) .............................. JP2020-090915

(51) Int. Cl.
| | |
|---|---|
| *H01M 8/04858* | (2016.01) |
| *B60L 58/40* | (2019.01) |
| *B60L 58/34* | (2019.01) |
| *H01M 8/04701* | (2016.01) |

(52) U.S. Cl.
CPC ........... *H01M 8/0494* (2013.01); *B60L 58/34* (2019.02); *B60L 58/40* (2019.02); *H01M 8/04708* (2013.01); *H01M 8/04947* (2013.01); *H01M 2250/20* (2013.01)

(58) Field of Classification Search
CPC ...... H01M 2250/20; B60L 58/34; B60L 58/40
See application file for complete search history.

(56) References Cited

U.S. PATENT DOCUMENTS

2007/0222413 A1* 9/2007 Kinoshita ............... B60L 58/40
 320/104
2010/0203409 A1 8/2010 Manabe et al.

FOREIGN PATENT DOCUMENTS

JP 4458126 B2 4/2010

\* cited by examiner

*Primary Examiner* — Adam A Arciero
(74) *Attorney, Agent, or Firm* — Dickinson Wright, PLLC

(57) ABSTRACT

A battery and a load device are connected to a fuel cell stack. Electric power is supplied from the battery to fuel cell auxiliary equipment. A controller of a fuel cell system has stored therein a desired output of the fuel cell stack. The controller predicts auxiliary equipment power consumption, which is the amount of electric power that is consumed by the fuel cell auxiliary equipment for operation of the fuel cell stack, and determines estimated input and output power of the battery. The controller determines a requested output, which is an output requested for the fuel cell stack, based on the predicted auxiliary equipment power consumption and the estimated input and output power. The controller determines an operating point of the fuel cell stack based on the desired output. The load device controls its operation so that the difference between the requested output and the desired output becomes zero.

7 Claims, 2 Drawing Sheets

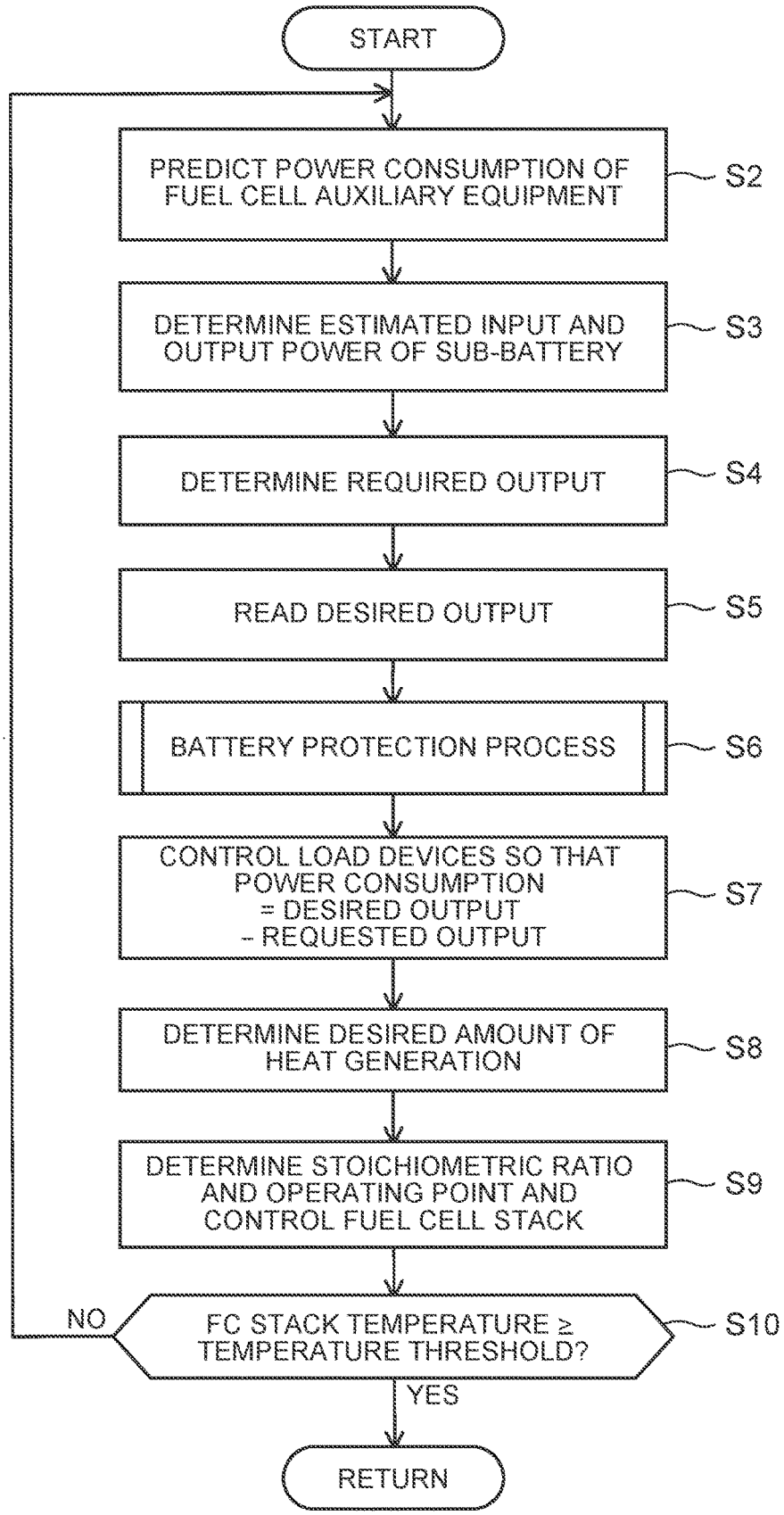

FUEL CELL SYSTEM

CROSS-REFERENCE TO RELATED APPLICATION

This application claims priority to Japanese Patent Application No. 2020-090915 filed on May 25, 2020, incorporated herein by reference in its entirety.

BACKGROUND

1. Technical Field

The technique disclosed herein relates to fuel cell systems. The specification provides a technique capable of responding to changes in power consumption of fuel cell auxiliary equipment while reducing sudden changes in operating point of a fuel cell stack.

2. Description of Related Art

Japanese Patent No. 4458126 discloses a fuel cell system that determines an output requested to a fuel cell stack (requested output) and the amount of heat that should be generated by the fuel cell stack (required amount of heat generation) and determines an operating point so as to achieve the requested output and the required amount of heat generation. The requested output includes electric power of electric devices that are used for operation of the fuel cell stack. In the specification, the electric devices that are used for operation of the fuel cell stack are referred to as the fuel cell auxiliary equipment. Examples of the fuel cell auxiliary equipment include an air compressor that feeds air to the fuel cell stack, a hydrogen pump that controls the circulating flow rate of hydrogen gas, and a circulating pump of a cooler that cools the fuel cell stack.

The fuel cell system of Japanese Patent No. 4458126 is mounted on an automobile. The required amount of heat generation is the amount of heat required to raise the temperature of the fuel cell stack itself, the amount of heat required to heat a vehicle cabin, etc. A battery is connected to the fuel cell stack of Japanese Patent No. 4458126, and the output of the fuel cell stack and the output of the battery can be supplied to the fuel cell auxiliary equipment.

SUMMARY

The fuel cell system controls the fuel cell stack so as to achieve the required output. Power consumption of the fuel cell auxiliary equipment changes from moment to moment according to the situation. The output of the fuel cell stack is not very responsive. The output of the fuel cell stack may not follow changes in power consumption. If the operating point of the fuel cell stack is forcibly and suddenly changed in response to changes in power consumption, the control for the fuel cell stack may become unstable. The specification provides a technique capable of responding to changes in power consumption of fuel cell auxiliary equipment while reducing sudden changes in operating point of a fuel cell stack.

A fuel cell system disclosed in the specification includes: a fuel cell stack; fuel cell auxiliary equipment that is used for operation of the fuel cell stack; a battery connected to an output terminal of the fuel cell stack; a load device connected to the output terminal of the fuel cell stack; and a controller. The controller controls the fuel cell auxiliary equipment and the load device. The controller has stored therein a desired output of the fuel cell stack. The controller predicts auxiliary equipment power consumption. The auxiliary equipment power consumption is an amount of electric power that is consumed by the fuel cell auxiliary equipment for the operation of the fuel cell stack. The controller determines estimated input and output power of the battery. The controller determines a requested output based on the predicted auxiliary equipment power consumption and the estimated input and output power. The requested output is an output requested for the fuel cell stack. The controller determines an operating point of the fuel cell stack based on the desired output. The load device controls operation of the load device in such a manner that a difference between the requested output and the desired output becomes zero.

In the fuel cell system disclosed in the specification, the operating point of the fuel cell stack is determined so as to achieve the predetermined desired output. The operating point means a combination of output current and output voltage of the fuel cell stack. When the desired output is determined in advance so as to change slowly with time, the operating point will not change suddenly. As described above, the power consumption of the fuel cell auxiliary equipment (i.e., requested power) changes from moment to moment. In the technique disclosed in the specification, the difference between the requested output and the desired output is absorbed by adjusting the operation (i.e., power consumption) of the load device. Since the power consumption of the load device is adjusted according to changes in requested output, it is not necessary to change the desired output (i.e., actual output of the fuel cell stack) from a planned value. The fuel cell system disclosed in the specification can respond to change in the power consumption of the fuel cell auxiliary equipment while reducing sudden changes in operating point of the fuel cell stack. The desired output is determined in advance based on estimated power consumption of the fuel cell auxiliary equipment that is determined according to the outside air temperature etc.

If the load device is stopped when the requested output is larger than the desired output, the difference between the requested output and the desired output cannot be eliminated. Accordingly, the desired output may include the estimated power consumption of the fuel cell auxiliary equipment that is determined based on the outside air temperature etc., and estimated power consumption of the load device. Including the estimated power consumption of the load device in the desired output prevents the requested output from becoming larger than the desired output.

In the fuel cell system disclosed in the specification, the battery is connected to the fuel cell stack. The output of the battery is more responsive than the fuel cell stack. The battery can therefore respond to sudden changes in power consumption. However, when the state of charge (SOC) of the battery is low, there is a risk that sufficient power may not be supplied from the battery to the fuel cell auxiliary equipment when the power consumption increases suddenly. Accordingly, the estimated input and output power according to the SOC of the battery is determined in advance, and the requested power including the estimated input and output power is determined. For example, when the SOC is low, predetermined power (charging power) from the fuel cell stack toward the battery is determined as the estimated input and output power. The battery is charged with a part of the power of the fuel cell stack.

The battery has an allowable input and output range. The allowable input and output range is an allowable range for the input and output power. When actual input and output power of the battery is larger than the allowable input and output range, the controller may correct the desired output so as to cause the actual input and output power to return to a value within the allowable input and output range. While the input and output power of the battery is within the allowable range, it is not necessary to change the desired output and sudden changes in operating point are reduced. When the input and output power of the battery is out of the allowable range, the desired output is corrected as an exception to protect the battery.

The controller determines the operating point (desired current and desired voltage) of the fuel cell stack so as to achieve the desired output. When it is desired to heat the fuel cell stack, the controller determines a desired amount of heat generation per unit time of the fuel cell stack and determines the operating point and a stoichiometric ratio so as to achieve the desired output and the desired amount of heat generation. The stoichiometric ratio means the amount of oxygen with respect to the amount of hydrogen that is supplied to the fuel cell stack. The lower the stoichiometric ratio, the greater the power generation loss. The power generation loss is released in the form of heat. The fuel cell stack can be warmed by intentionally increasing the power generation loss.

Details of the technique disclosed in the specification and further improvements will be described in the section "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart of a fuel cell stack control process.

DETAILED DESCRIPTION OF EMBODIMENTS

Figure 1:
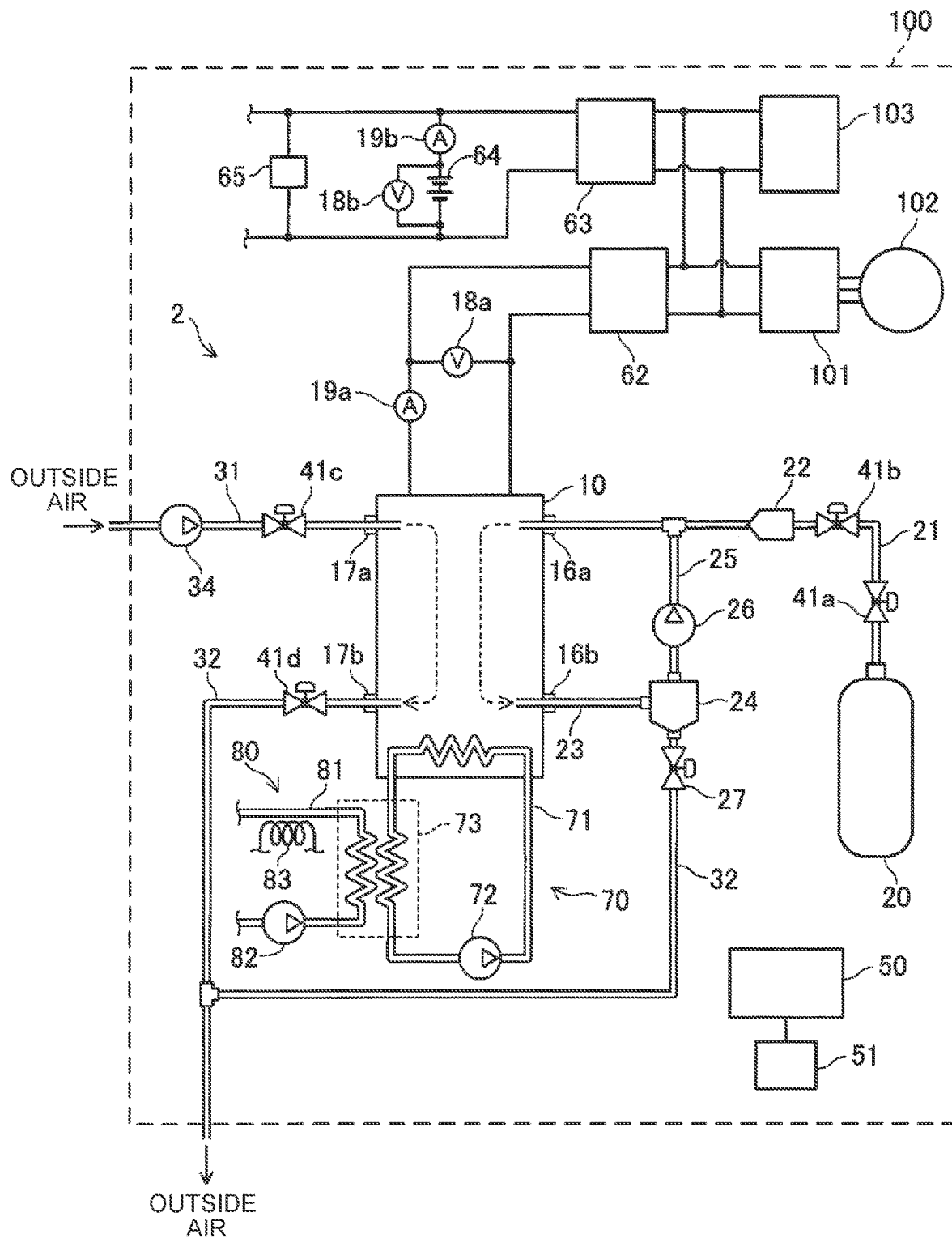
FIG. 1 is a block diagram of a fuel cell vehicle including a fuel cell system of an embodiment.

A fuel cell system 2 of an embodiment will be described with reference to the drawings. The fuel cell system 2 is mounted on a fuel cell vehicle 100. FIG. 1 is a block diagram of the fuel cell vehicle 100 including the fuel cell system 2. The fuel cell vehicle 100 receives electric power from the fuel cell system 2 and runs on an electric motor 102. The output of a fuel cell stack 10 is boosted by a boost converter 62 and then converted to AC power by an inverter 101, and the AC power is supplied to the electronic motor 102. In the specification, the "output" of the fuel cell stack 10 means output power. In the following description, the fuel cell stack 10 is sometimes referred to as the "FC stack 10" for simplicity. The state of charge of the battery is sometimes referred to as the "SOC."

A main battery 103 is also connected to an output terminal of the boost converter 62. Of the output of the FC stack 10, the power not consumed by the electric motor 102 is stored in the main battery 103. The output of the FC stack 10 is not very responsive. The power of the main battery 103 is used to improve responsiveness of changes in power that is supplied to the electric motor 102.

A buck converter 63 is also connected to the output terminal of the boost converter 62. A sub-battery 64 is connected to an output terminal of the buck converter 63. A part of the output of the FC stack 10 is stepped down by the buck converter 63 and stored in the sub-battery 64.

The output voltage of the main battery 103 is higher than 100 volts. The output voltage of the sub-battery 64 is lower than 50 volts. The power of the main battery 103 is supplied to the electric motor 102. The power of the sub-battery 64 is supplied to devices that operate at voltages below 50 volts. The devices that are powered by the sub-battery 64 include low power devices such as various controllers (computers) and a radio 65. The power of the FC stack 10 is sometimes supplied to the low power devices via the boost converter 62 and the buck converter 63.

The sub-battery 64 also supplies power to auxiliary equipment of the fuel cell system (fuel cell auxiliary equipment) 2. In other words, the fuel cell auxiliary equipment is powered by the sub-battery 64. The fuel cell auxiliary equipment is a general term for electric devices that are used to start and operate the fuel cell stack. The fuel cell auxiliary equipment will be described later. The power of the FC stack 10 is sometimes supplied to the fuel cell auxiliary equipment via the boost converter 62 and the buck converter 63.

The fuel cell system 2 includes a voltage sensor 18b and a current sensor 19b. The voltage sensor 18b measures the voltage of the sub-battery 64, and the current sensor 19b measures the input and output current of the sub-battery 64. The measured values of the voltage sensor 18b and the current sensor 19b are sent to a controller 50.

The fuel cell system 2 further includes the FC stack 10 and a fuel tank 20. The FC stack 10 is an assembly of a large number of fuel cells. As is well known in the art, each fuel cell is divided into an anode side and a cathode side with an electrolyte membrane therebetween. Fuel gas is supplied to the anode side through an anode gas inlet 16a. Air is supplied to the cathode side through a cathode gas inlet 17a. Hydrogen contained in the fuel gas is ionized, and the hydrogen ions react with oxygen contained in the air on the cathode side to produce electricity. Since the chemical reaction in the fuel cell (FC stack 10) is well known in the art, detailed description thereof will be omitted.

Excess fuel gas not consumed in the chemical reaction and impurities produced in the chemical reaction are discharged from an anode gas outlet 16b. The gas that is discharged from the anode gas outlet 16b is sometimes referred to as the fuel off gas. Produced water and excess air (oxygen) are discharged from a cathode gas outlet 17b.

Equipment on the fuel gas side of the fuel cell system 2 will be described. The fuel cell system 2 includes, as equipment for feeding fuel gas to the anode side of the FC stack 10, a fuel supply pipe 21, an injector 22, an off gas discharge pipe 23, a gas-liquid separator 24, a return pipe 25, a hydrogen pump 26, and an exhaust and drain valve 27.

The fuel supply pipe 21 connects the fuel tank 20 and the FC stack 10. Two valves 41a, 41b and the injector 22 are connected to the fuel supply pipe 21. The valve 41a is a main stop valve and stops release of fuel gas from the fuel tank 20 while the fuel cell system 2 is stopped. The valve 41b is a pressure regulating valve and regulates the pressure of fuel gas to be supplied to the injector 22. The injector 22 increases the pressure of fuel gas and supplies the resultant fuel gas to the FC stack 10.

The fuel supply pipe 21 has its one end connected to the anode gas inlet 16a of the FC stack 10 and supplies fuel gas to the anode side of the FC stack 10. The off gas discharge pipe 23 has its one end connected to the anode gas outlet 16b and the other end connected to the gas-liquid separator 24.

The gas-liquid separator 24 separates the fuel off gas discharged from the anode gas outlet 16b into hydrogen gas (residual fuel gas) and impurities. Typical impurities separated by the gas-liquid separator 24 are nitrogen gas, water, etc. The nitrogen gas is the nitrogen contained in the air supplied to the cathode side and having passed through the electrolyte membrane and reached the anode side. The residual fuel gas is discharged from a gas outlet, and the impurities are discharged from an impurity discharge port. A part of the impurity gas (nitrogen gas) flows out from the gas outlet together with the residual fuel gas.

The return pipe 25 has its one end connected to the gas outlet of the gas-liquid separator 24 and the other end connected to the fuel supply pipe 21. The hydrogen pump 26 is attached to the return pipe 25. The hydrogen pump 26 returns the residual fuel gas separated by the gas-liquid separator 24 to the FC stack 10 through the return pipe 25 and the fuel supply pipe 21. That is, the hydrogen pump 26 adjusts the circulating flow rate of the hydrogen gas.

The exhaust and drain valve 27 is connected to the impurity discharge port of the gas-liquid separator 24. An exhaust pipe 32 is connected to an outlet of the exhaust and drain valve 27. When the exhaust and drain valve 27 is opened, the impurities separated from the fuel off gas by the gas-liquid separator 24 are discharged to the exhaust pipe 32.

Equipment on the air supply side of the fuel cell system 2 will be described. The fuel cell system 2 includes, as equipment for feeding air (oxygen) to the cathode side of the FC stack 10, an air supply pipe 31, an air compressor 34, and valves 41c, 41d.

The air supply pipe 31 has its one end connected to the cathode gas inlet 17a of the FC stack 10 and the other end open to outside air. The air compressor 34 and the valve 41c are attached to an intermediate part of the air supply pipe 31. The air compressor 34 compresses the outside air and supplies the compressed air to the cathode side of the FC stack 10 through the air supply pipe 31. The exhaust pipe 32 is connected to the cathode gas outlet 17b of the FC stack 10. The valve 41d is attached to an intermediate part of the exhaust pipe 32. The valves 41c, 41d are pressure regulating valves. These pressure regulating valves regulate the pressure of the air to be supplied to the FC stack 10.

The exhaust pipe 32 is connected to the outlet of the exhaust and drain valve 27 and the cathode gas outlet 17b. The exhaust pipe 32 mixes the air discharged from the cathode gas outlet 17b of the FC stack 10 and the impurity gas discharged from the outlet of the exhaust and drain valve 27 and discharges the resultant mixture to the outside air. The water produced by the FC stack 10 is also discharged to the outside of the fuel cell vehicle through the exhaust pipe 32.

Although not shown in the figure, the fuel cell system 2 further includes a pressure sensor, a concentration sensor, or a flow rate sensor at various places. A voltage sensor 18a and a current sensor 19a are attached to an output terminal of the FC stack 10. The current sensor 19a measures the output current of the FC stack 10, and the voltage sensor 18a measures the output voltage of the FC stack 10. The measured values of these sensors are sent to the controller 50.

The fuel cell system 2 further includes a cooler 70 that cools the FC stack 10. The cooler 70 includes a flow path pipe 71, a circulating pump 72, and a heat exchanger 73. Cooling water is sealed in the flow path pipe 71. The circulating pump 72 circulates the cooling water in the flow path pipe 71. The flow path pipe 71 passes through the FC stack 10. The cooling water absorbs heat from the FC stack 10 while flowing through the FC stack 10. The heat absorbed in the FC stack 10 is transferred to a cabin heater 80 by the heat exchanger 73. The cabin heater 80 includes a flow path pipe 81 and a pump 82. The pump 82 circulates a heating medium in the flow path pipe 81. The cabin heater 80 heats the vehicle cabin using the heat of the FC stack 10. The cabin heater 80 further includes an electric heater 83. The electric heater 83 heats the heating medium when the heat of the FC stack 10 is not enough to heat the vehicle cabin.

The controller 50 adjusts the output current and output voltage of the FC stack 10 by adjusting the output voltage of the boost converter 62.

The controller 50 controls the injector 22, the pumps 26, 72, and 82, the valves 41a to 41d (solenoid operated valves), the exhaust and drain valve 27, the air compressor 34, the boost converter 62, the buck converter 63, the inverter 101, and the electric heater 83. Although these devices and the controller 50 are connected by signal lines, the signal lines are not shown in FIG. 1. The injector 22, the hydrogen pump 26, the circulating pump 72, the valve 41a to 41d, the exhaust and drain valve 27, the air compressor 34, the boost converter 62, the buck converter 63, and the controller 50 are included in the fuel cell auxiliary equipment. The electric heater 83, the pump 82, and the radio 65 are devices that are not involved in starting and operation of the FC stack 10. The power of the sub-battery 64 is supplied to the fuel cell auxiliary equipment and the electric devices (electric heater 83, pump 82, and radio 65) that are not involved in operation of the FC stack 10. Power lines connecting the fuel cell auxiliary equipment and other electric devices to the sub-battery 64 are also not shown in FIG. 1. The power of the FC stack 10 is sometimes supplied to the fuel cell auxiliary equipment and the electric devices that are not involved in operation of the FC stack 10 via the boost converter 62 and the buck converter 63.

A nonvolatile memory 51 is connected to the controller 50. The memory 51 has stored therein programs that are executed by the controller 50 and variables that are used for the programs. The variables that are used for the programs include a desired output of the FC stack 10. A process that is executed by the controller 50 and the desired output will be described later.

Operation of the FC stack 10 in the fuel cell system 2 of the embodiment will be described. As is well known in the art, the FC stack 10 generates electricity by a reaction between fuel gas (hydrogen) and oxidizing gas (air). The amount of power generation by the FC stack 10 can be adjusted by the amounts of hydrogen and oxygen that are supplied to the FC stack 10. The controller 50 adjusts the amounts of hydrogen and oxygen that are supplied to the FC stack 10 by using the fuel cell auxiliary equipment so as to achieve the output requested for the FC stack 10 (requested output).

For the FC stack 10, an I-V curve is determined according to the amounts of hydrogen and oxygen that are supplied to the FC stack 10. The I-V curve is a curve indicating the relationship between the output current (desired current I) and the voltage of the FC stack 10 (desired output V). The controller 50 determines an operating point (combination of desired current and desired voltage of the FC stack 10) on the I-V curve and controls the boost converter 62 so as to achieve the desired current. As described above, the controller 50 adjusts the output current of the FC stack 10 by adjusting the output voltage of the boost converter 62. When the desired current is achieved, the desired voltage is also achieved accordingly.

The output of the FC stack 10 is not very responsive. The output of the FC stack 10 therefore cannot follow sudden changes in requested output (including power consumption of the fuel cell auxiliary equipment). If the operating point is forcibly and suddenly changed, the control may become unstable. The fuel cell system 2 of the embodiment can respond to changes in power consumption of the fuel cell auxiliary equipment while reducing sudden changes in operating point of the FC stack 10.

A process that is executed when the electric motor 102 is stopped and the FC stack 10 is rapidly warmed up will be described. The rapid warm-up is a process of raising the temperature of the FC stack 10 using self-heating of the FC stack 10. The rapid warm-up is performed when a main switch of the fuel cell vehicle 100 is turned on in a low outside air temperature environment. The rapid warm-up is also performed when water is forcibly drained from the FC stack 10 or when the main switch of the fuel cell vehicle 100 is turned off in a low outside air temperature environment.

FIG. 2 is a flowchart of an FC stack control process (rapid warm-up process) that is executed by the controller 50. When the rapid warm-up is necessary, the controller 50 repeats the process of FIG. 2 in a predetermined cycle (control cycle).

First, the controller 50 predicts power consumption of the fuel cell auxiliary equipment (step S2). The predicted power consumption is referred to as the predicted auxiliary equipment power consumption. The controller 50 predicts power consumption of the fuel cell auxiliary equipment from the outside air temperature, the temperature of the FC stack 10, the internal pressure of the fuel tank 20, the state of the fuel cell auxiliary equipment, etc. For example, the controller 50 has stored therein a function for calculating the predicted auxiliary equipment power consumption based on the outside air temperature, the temperature of the FC stack 10, the internal pressure of the fuel tank 20, etc. Detailed description of a specific example of the predicting process will be omitted.

Next, the controller 50 determines estimated input and output power of the sub-battery 64 (step S3). The estimated input and output power can be obtained by a function that takes the SOC etc. as input variables. The estimated input and output power is determined so that the current SOC becomes closer to a reference value (e.g., 60%). When the current SOC is lower than the reference value, the estimated input and output power is determined in such a direction that a current flows into the sub-battery 64. When the current SOC is higher than the reference value, the estimated input and output power is determined in such a direction that a current flows out of the sub-battery 64. When the current SOC is close to the reference value, the estimated input and output power is set to zero. The relationship between the SOC and the estimated input and output power is stored in advance in the controller 50 (memory 51).

The controller 50 then determines output power requested for the FC stack 10 (requested output) (step S4). The requested output is determined by the predicted auxiliary equipment power consumption and the estimated input and output power. For example, the requested output is determined as the sum of the predicted auxiliary equipment power consumption and the estimated input and output power. In this case, the estimated input and output power is positive when a current flows toward the sub-battery 64.

Subsequently, the controller 50 reads a desired output from the memory 51 (step S5). The desired output is a desired value of the output of the FC stack 10. The desired output is expressed in electric power (kilowatts). The desired output is stored in the memory 51 in the form of a map or function that takes the outside air temperature, the temperature of the FC stack 10, and the state of the fuel cell auxiliary equipment as input variables. The desired output includes estimated power consumption of some electric devices. For example, the estimated power consumption is defined as follows. When the outside air temperature is low, it is likely that the electric heater 83 of the cabin heater 80 will be used. When the outside air temperature is high, it is likely that a cabin cooler will be used. The estimated power consumption is determined in advance as the estimated power consumption of the electric device(s) that is expected to operate according to the outside air temperature. The estimated power consumption may include the estimated power consumption of the fuel cell auxiliary equipment. The controller 50 determines the desired output corresponding to the current outside air temperature, the temperature of the FC stack 10, etc. from the map or relational expression stored in the memory 51.

In a battery protection process of step S6, the desired output is corrected when the power actually flowing into the sub-battery 64 is larger than a predetermined allowable range. The battery protection process will be described later. It is herein assumed that the correction of the desired output is not necessary.

The controller 50 controls specific load devices. The controller 50 controls the load devices so that power consumption of the load devices becomes equal to the power difference between the requested power and the desired output (step S7). The load devices are predetermined electric devices and are typically electric devices that are not involved in operation of the FC stack 10. For example, the load devices are the pump 82 and the electric heater 83 of the cabin heater 80, the radio 65, etc.

More specifically, the controller 50 notifies the load devices of desired power consumption (that is, the difference between the desired power and the requested power). The load devices notified of the desired power consumption control their own operation so that their power consumption becomes equal to the desired power consumption. In other words, the load devices control their own operation so that the difference between the desired output and the requested output becomes zero.

The fuel cell auxiliary equipment is sometimes included in the load devices. When the difference between the requested power and the desired output is small, the fuel cell auxiliary equipment may be included in the load devices as long as it does not affect power generation of the FC stack 10.

Subsequently, the controller 50 determines a desired amount of heat generation per unit time of the FC stack 10 (step S8). The desired amount of heat generation is the amount of heat required for rapid warm-up. The desired amount of heat generation per unit time is expressed in watts. The desired amount of heat generation is determined depending on the outside air temperature, the temperature of the FC stack 10, and the state of the fuel cell vehicle 100. The desired amount of heat generation is stored in advance in the memory 51 as a function (or map) that takes the outside air temperature, the temperature of the FC stack 10, and the state of the fuel cell vehicle 100 as input variables. The controller 50 determines the desired amount of heat generation according to the current state of the fuel cell system 2 by the map or function stored in the memory 51.

As is well known in the art, for FC stacks, an appropriate amount of oxygen has been determined for the amount of hydrogen. When the amount of oxygen is smaller for the amount of hydrogen, the power generation efficiency decreases. Power generation loss appears as heat. When the amount of oxygen is intentionally reduced with respect to the amount of hydrogen, the power generation loss increases. The FC stack 10 generates heat due to the energy loss, and the temperature of the FC stack 10 rises. The ratio of the amount of oxygen to the amount of hydrogen is called the stoichiometric ratio.

The controller 50 determines the stoichiometric ratio and the operating point from the desired output and the desired amount of heat generation. The controller 50 then controls the FC stack 10 so as to achieve the determined stoichiometric ratio and operating point (step S9). In other words, the controller 50 controls the fuel cell auxiliary equipment so that the FC stack 10 achieves the determined stoichiometric ratio and the desired output.

An example of calculation of the operating point (desired current and desired voltage of the FC stack 10) will be described. As described above, for FC stacks, an appropriate amount of oxygen has been determined for the amount of hydrogen. The voltage when an appropriate amount of oxygen is supplied for the amount of hydrogen is called the theoretical electromotive voltage. The requested output is determined in step S4, and the desired amount of heat generation (desired amount of heat generation per unit time) is determined in step S8. At this time, the energy that should be output by the FC stack 10 is (requested output+desired amount of heat generation). Assuming that an appropriate amount of oxygen is supplied, the output current (desired current) of the FC stack 10 is obtained by the following relational expression.

Desired current=(requested output+desired amount of heat generation)/theoretical electromotive voltage The stoichiometric ratio is determined so that the desired amount of heat generation is released as thermal energy. The power output of the FC stack 10 is therefore only the requested output. Since the requested output=desired current×desired voltage, the desired voltage is obtained by the following relational expression.

Desired voltage=theoretical electromotive voltage× requested output/(requested output+desired amount of heat generation)

The controller 50 repeats the above process until the temperature of the FC stack 10 reaches a predetermined temperature threshold (steps S10: NO, S2). When the temperature of the FC stack 10 reaches the temperature threshold, the controller 50 ends the process (step S10: YES).

Advantages of the process of FIG. 2 will be described. The controller 50 determines the stoichiometric ratio and operating point of the FC stack 10 based on the predetermined desired output and the desired amount of heat generation that is determined by the outside air temperature and the temperature of the FC stack 10. The controller 50 then controls the fuel cell auxiliary equipment so as to achieve the determined stoichiometric ratio and operating point. The desired output is determined in advance so as to change slowly with time. The operating point therefore will not change suddenly but will change slowly.

The power consumption of the fuel cell auxiliary equipment that is used to operate the FC stack 10 changes from moment to moment. The controller 50 does not determine the operating point in response to the power consumption (output requested for the FC stack 10), but determines the operating point according to the desired output. The FC stack 10 outputs power corresponding to the desired output. There is a difference between the actual output (desired output) of the FC stack 10 and the requested power. The controller 50 controls the load devices so as to eliminate the difference.

Since the controller 50 of the fuel cell system 2 of the embodiment controls the output of the FC stack 10 so that the output of the FC stack 10 follows the desired output, the operating point will not change suddenly. That is, sudden changes in operating point are reduced. The power consumption of the fuel cell auxiliary equipment (requested output) changes from moment to moment according to the state of the fuel cell auxiliary equipment and the temperature (temperature of the FC stack or outside air temperature). The difference between the actual output (desired output) and the requested output is adjusted by the power consumption of the load devices. The fuel cell system 2 of the embodiment can reduce sudden changes in operating point while achieving the requested output that changes from moment to moment.

The desired output includes the estimated power consumption of the load devices. When the requested power is larger than planned, the load devices are controlled so that the power consumption of the load devices becomes smaller than the estimated power consumption. Since the actual power consumption of the load devices becomes smaller than the estimated power consumption of the load devices included in the desired output, an increased amount of power is supplied from the FC stack 10 to the fuel cell auxiliary equipment.

The battery protection process in step S6 of FIG. 2 will be described. The input and output power of the sub-battery 64 has an allowable range (allowable input and output range). When the input and output power of the sub-battery 64 is out of the allowable input and output range, the controller 50 corrects the desired output of the FC stack 10 so as to cause the actual input and output power of the sub-battery 64 to return to a value within the allowable input and output range. When the output of the sub-battery 64 is larger than the allowable input and output range, the controller 50 increases the desired output. By increasing the desired output, the actual output of the FC stack 10 increases and the output of the sub-battery 64 decreases.

Alternatively, when the charging power that is supplied to the sub-battery 64 is larger than the allowable input and output range, the controller 50 reduces the desired output. By reducing the desired output, the actual output of the FC stack 10 decreases and the charging power that is supplied to the sub-battery 64 decreases.

The controller 50 corrects the desired output when the input and output power of the sub-battery 64 has been larger than the upper limit of the allowable input and output range or smaller than the lower limit of the allowable input and output range by more than a predetermined amount for a predetermined time period. After the main switch of the fuel cell vehicle 100 is turned on, the input and output power of the sub-battery 64 may become out of the allowable input and output range a plurality of times. The predetermined time period and predetermined amount when the input and output power of the sub-battery 64 becomes out of the allowable input and output range for the first time are referred to as the first predetermined time period and the first predetermined amount. The predetermined time period and predetermined amount when the input and output power of the sub-battery 64 becomes out of the allowable input and output range for the second and subsequent times are referred to as the second predetermined time period and the second predetermined amount. The second predetermined time period is set to a value shorter than the first predetermined time period, and the second predetermined amount is set to a value smaller than the first predetermined amount.

The points to be noted regarding the technique described in the embodiment will be described. The sub-battery 64 is an example of the battery that is connected to the output terminal of the FC stack 10 and that supplies electric power to the fuel cell auxiliary equipment. Typical examples of the load devices are the electric devices that are not involved in operation of the FC stack 10, such as the radio 65. When the difference between the requested power and the desired power is small, the fuel cell accessory equipment may be the load devices.

The process of FIG. 2 is executed when rapid warm-up (process of rapidly warming the FC stack 10) is required. The fuel cell vehicle 100 is stopped during execution of this process. That is, the inverter 101 and the electric motor 102 are stopped. Therefore, the desired output is accurately determined in advance. When the process of FIG. 2 is executed while the fuel cell vehicle 100 is traveling, the desired output may be determined in advance as a function including the outside air temperature, the temperature of the FC stack, and the accelerator operation amount and the vehicle speed.

When the rapid warm-up is not required, steps S8 and S10 of FIG. 2 are omitted. In this case, the stoichiometric ratio in step S9 is determined so that an optimum amount of oxygen is supplied for the amount of hydrogen to be supplied.

Although specific examples of the disclosure are described in detail above, these examples are illustrative only and are not intended to limit the scope of the claims. The technique described in the claims include various modifications and alterations of the specific examples illustrated above. The technical elements described in the specification or the drawings are technically useful alone or in various combinations, and are not limited to the combinations described in the claims as originally filed. The technique illustrated in the specification or the drawings can achieve a plurality of objects at the same time, and the technique achieving even one of the objects is technically useful.

What is claimed is:

1. A fuel cell system, comprising:
    a fuel cell stack;
    fuel cell auxiliary equipment that is used for operation of the fuel cell stack;
    a main battery that supplies power to an electric motor;
    a sub-battery connected to an output terminal of the fuel cell stack, wherein an output voltage of the sub-battery is lower than the output voltage of the main battery;
    a load device connected to the output terminal of the fuel cell stack; and
    a controller programmed to control the fuel cell auxiliary equipment and the load device and having stored a desired output of the fuel cell stack, wherein
    the controller is programmed to predict auxiliary equipment power consumption, the auxiliary equipment power consumption being an amount of electric power that is consumed by the fuel cell auxiliary equipment for the operation of the fuel cell stack,
    determine estimated input and output power of the sub-battery,
    determine a requested output based on the predicted auxiliary equipment power consumption and the estimated input and output power, the requested output being an output requested for the fuel cell stack, and
    determine an operating point of the fuel cell stack based on the desired output, and
    the load device is configured to control operation of the load device in such a manner that a difference between the requested output and the desired output becomes zero;
    wherein the estimated input and output power is determined based on a state of charge of the sub-battery;
    wherein the controller has a memory which stores a relationship between a state of charge of the sub-battery and the estimated input and output power; wherein the controller compares the current state of charge of the sub-battery with a reference value, and when the current state of charge of the sub-battery is lower than the reference value the controller determines the estimated input and output power to increase the requested output.

2. The fuel cell system according to claim 1, wherein when actual input and output power of the sub-battery is larger than an allowable input and output range of the sub-battery, the controller corrects the desired output so as to cause the actual input and output power to return to a value within the allowable input and output range.

3. The fuel cell system according to claim 1, wherein the desired output includes estimated power consumption of the fuel cell auxiliary equipment that is determined based on an outside air temperature, and predetermined estimated power consumption of the load device.

4. The fuel cell system according to claim 1, wherein the load device is an electric device that does not affect the operation of the fuel cell stack.

5. The fuel cell system according to claim 1, wherein the controller determines a desired amount of heat generation per unit time of the fuel cell stack based on the outside air temperature and a temperature of the fuel cell stack and determines the operating point and a stoichiometric ratio of hydrogen and oxygen that are supplied to the fuel cell stack based on the desired amount of heat generation and the desired output.

6. The fuel cell system according to claim 1, wherein the power of the sub-battery is supplied to the fuel cell auxiliary equipment and the electric devices that are not involved in operation of the fuel cell stack.

7. The fuel cell system according to claim 1, wherein the load device comprises a radio.

* * * * *